United States Patent [19]

Beller

[11] Patent Number: 4,882,985

[45] Date of Patent: Nov. 28, 1989

[54] ROLL AND LOAD ROTISSERIE ASSEMBLY

[75] Inventor: Frank W. Beller, Aurora, Ill.

[73] Assignee: Belson Manufacturing Co., Inc., North Aurora, Ill.

[21] Appl. No.: 195,847

[22] Filed: May 19, 1988

[51] Int. Cl.⁴ ............................................. A47J 43/18
[52] U.S. Cl. .................................. 99/426; 126/25 R; 99/419; 99/450
[58] Field of Search ................ 99/426, 427, 340, 449, 99/450, 385, 419, 421 R, 421 HV, 421 TP, 421 H, 444, 446, 449, 421 HH, 424; 126/25 R, 9 B; 16/357

[56] References Cited

U.S. PATENT DOCUMENTS

| | | | |
|---|---|---|---|
| 2,989,915 | 6/1961 | Lonzi | 99/400 X |
| 3,088,396 | 5/1963 | Proffitt | 99/421 H X |
| 3,343,527 | 9/1967 | Manteris | 126/25 R |
| 3,742,838 | 7/1973 | Luschen | 126/25 X |
| 4,089,258 | 5/1978 | Berger | 126/39 J X |
| 4,112,832 | 9/1978 | Severdia | 99/421 V X |
| 4,188,867 | 2/1980 | DeRemer | 99/401 X |
| 4,442,762 | 4/1984 | Beller | 99/427 |
| 4,467,709 | 8/1984 | Anstedt | 126/25 R X |

Primary Examiner—Harvey C. Hornsby
Assistant Examiner—K. O'Leary
Attorney, Agent, or Firm—Lee, Mann, Smith, McWilliams & Sweeney

[57] ABSTRACT

A roll and load rotisserie assembly capable of being mountably rested atop the firebox walls of a grill. The rotisserie assembly has a breadbox-type twin hood design that is pivotable to open at either side of the assembly. Support panels for the hood have loading slots adjacent roller assemblies for rotationally supporting the support shafts of a spit. The split may be removed from the roller assemblies by rolling the support shafts outwardly through the loading slots in a facile manner.

20 Claims, 3 Drawing Sheets

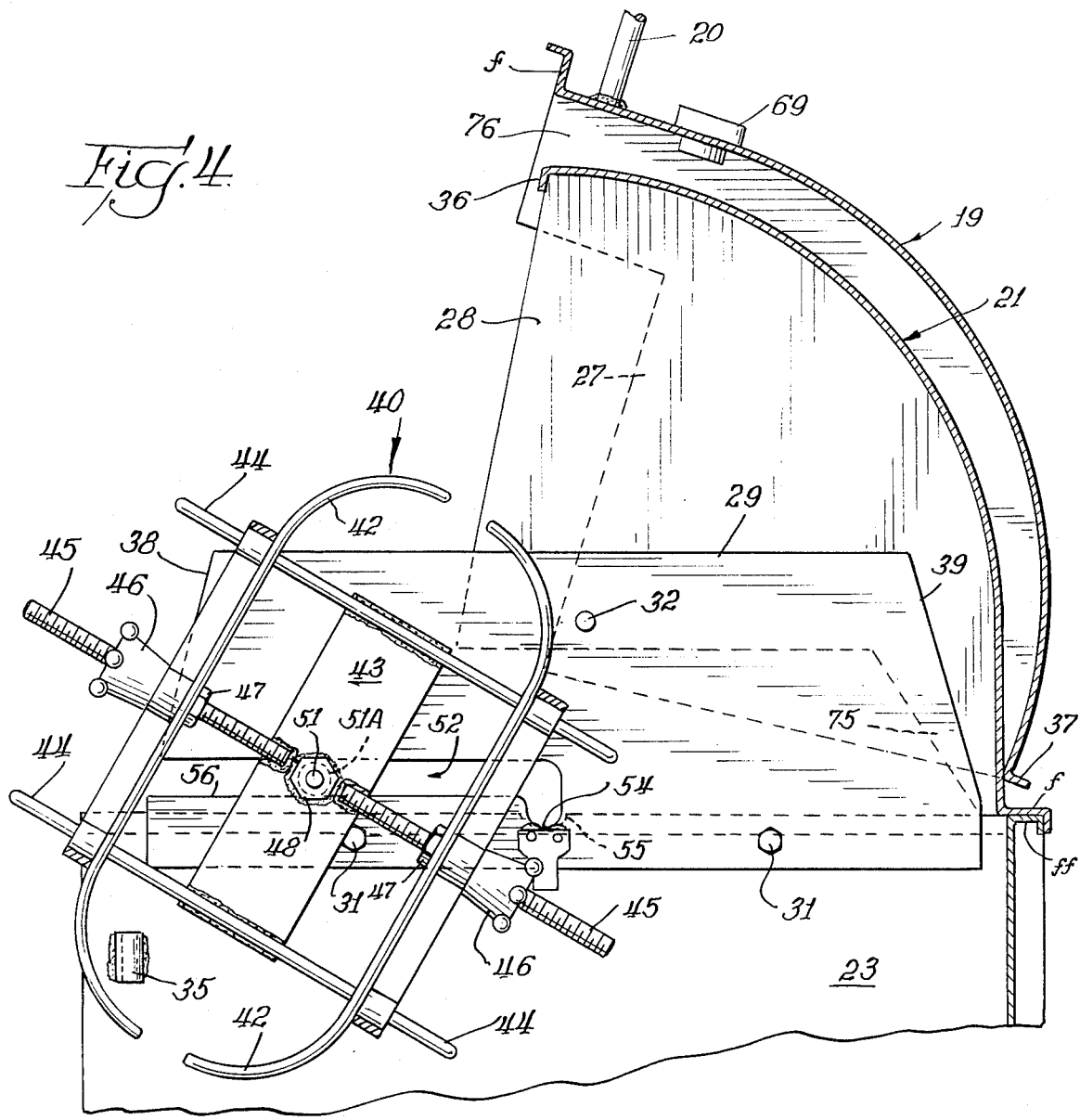
Fig. 4
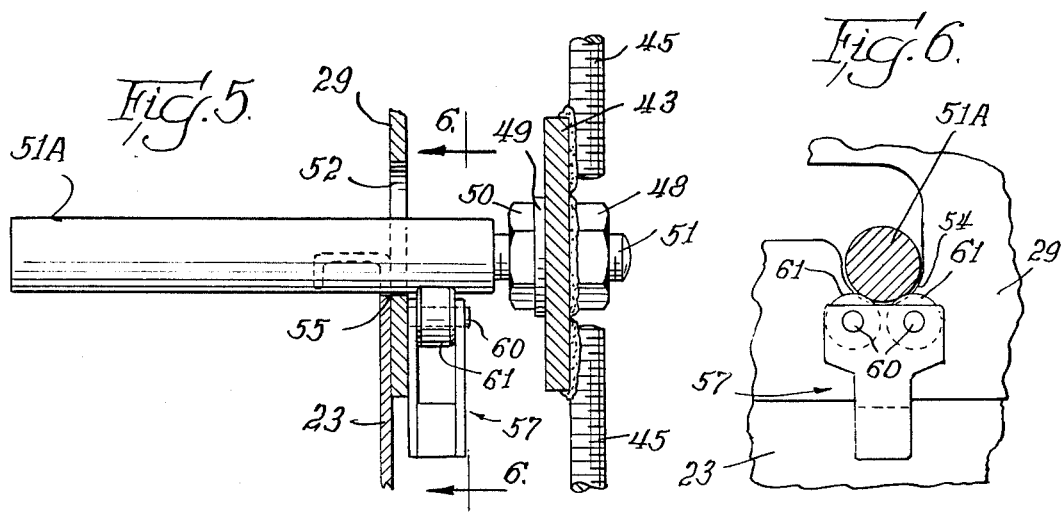
Fig. 5
Fig. 6

ROLL AND LOAD ROTISSERIE ASSEMBLY

BACKGROUND AND SUMMARY OF THE INVENTION

The invention generally relates to an outdoor rotisserie assembly utilizing a spit basket for an oven-type baking. In particular the invention relates to a self-contained rotisserie cabinet and hood adaptable for use as a removable attachment to outdoor grills having means for easily positioning a full loaded spit basket.

Outdoor rotisserie cooking usually involves the rotation of a spit basket over a heat source, which can accommodate a whole pig, lamb, or several portions of poultry, turkey, roasts or pork loins. Often, the spit basket is adjustable to accommodate different portions of food items to be cooked.

In conjunction with rotisserie cooking techniques, it has been found difficult to easily maneuver a spit basket filled with large portions of food to and from the heat source. It has also become a need of the caterers and other commercial food vending businesses to be afforded fast access to the interior of the rotisserie oven for basting, cutting, seasoning the food or otherwise for tending to the heat source, which might be charcoal, lava rocks, gas burners, mesquite and the like.

It is also a concern amongst commercial eating establishments, to allow serving portions of food from the side of the rotisserie oven that is away from the chef's working area.

In providing grill-type devices it has become a further goal of the food preparation industry to provide for an attachable rotisserie assembly that may simply be mounted onto an existing firebox of a grill without screws, clips, bolts or other fasteners, whereby just by slipping on and off of a cabinet housing and hood a grill may be converted to a pig roaster, for example.

In conjunction with providing a rotisserie cabinet and hood attachment for existing grill devices, it is further desirable if the spit basket containing the food items to be cooked could be easily maneuvered into a locked position in the rotisserie oven ready to be thereafter connected to the rotisserie motor shaft in an easy and safe manner.

It would be a further benefit to provide for a rotisserie oven that has a breadbox-type hood over a rotisserie cabinet which can open either from the front or back of the oven so that the cook may tend to basting the food item or tending to the heat source from either side, and in addition have the option of serving food from one side of the oven while tending to cooking chores from the other. This feature would be very useful for outdoor cooking events such as at large picnics and other social gatherings where hundreds of people will be participating in the meal.

It is therefore another sought-after goal to provide a breadbox-type hood in which the end walls of the hoods allow for opening and closing the hood from either side and wherein upon closing the hoods the end walls are formed to seat atop the end walls of rotisserie cabinet and prevent sideward and outward heat loss from the hot oven.

It has also been desired that a removable front panel for a rotisserie cabinet be provided so that the heat source may be tended, restoked, etc., such as would be the case when using charcoal residing in the firebox below the item to be cooked. It is further a objective of the invention to provide such a removable front cabinet panel that does not require the disassembly of the rest of the rotisserie cabinet whereby the spit basket can stay engaged to the rotisserie motor during removal of the front panel.

It is a concomitant object to provide a demountable rotisserie cabinet that offers a drip pan beneath the spit basket area to collect grease drippings and avoid flame-ups caused by grease and fat dripping from the meat or poultry items.

It is in conjunction with the desired for an efficient drip panel to also provide for a drain means that allows for the quick draining of the liquefied fats and oils from the pan outwardly of the rotisserie oven to be collected and removed.

The present invention satisfies the foregoing desires and needs of the cooking industry, particularly commercial caterers who provide meals for large numbers of people. The present invention provides a rotisserie cabinet that is made in the form of a removable housing attachable around the walls of a firebox of an existing grill device without the need for bolts, screws or other fastening attachments.

Further, a two part breadbox-type hood is provided for pivoting attachment to the rotisserie cabinet and which sealingly covers over the rotisserie cabinet but allows for access to either side of the spit basket.

The invention further provides for hood support panels at either end of the cabinet that provide pivot means for the breadbox-type hood and offer a heat bearier across the ends of the rotisserie cabinet to reduce heat loss.

The opposing end walls of the rotisserie cabinet are provided with a pair of roller brackets and rollers for rotationally supporting axle shafts of a spit basket until the chef disengages the rotisserie motor to remove the spit basket.

The rotisserie assembly provides for safe and sure rolling and loading maneuverability for the spit basket along its support axle shafts into roller brackets which requires little effort considering that the basket and retained foods items could weigh over one hundred pounds.

A front panel of the removable rotisserie cabinet is separately removable from the cabinet by the provision of upwardly slidable lock pins engaging sockets at the end walls of the cabinet whereby the front panel can be removed while the hood and other three walls of the rotisserie cabinet remain in place relative to the spit basket in order to allow the chef to, for example, tend to the fire or season the food items being cooked.

The removable rotisserie cabinet further provides for mounting a rotisserie motor at either end wall.

The breadbox-type hood is provided with dual pivoting inside and outside hoods that may be alternately opened from the front or back of the oven to grant access to the interior of the rotisserie cabinet from either side.

A front hood is provided to be hingedly movable to an open position slightly greater than 90 degrees from vertical so that complete access to the food items being cooked is achieved.

The roller bracket and rollers and the hood support panels at opposite ends cooperate with notched upper edges of the end walls of the rotisserie cabinet to allow for the spit basket to be rolled along support axles through slots in the hood support panels in a secure and controlled manner for loading and unloading the spit basket.

The invention further includes overlapping lower flanges of the rotisserie cabinet walls over the flanged top edges of the firebox walls to form an overlapped seal between flanges on the breadbox hood and upper flanges of the rotisserie cabinet.

The two hoods are separately pivotable past each other - allowing one to be open and one to remain closed.

The front part of the hood is preferably the outer pivoting hood and is provided with handles and a thermometer communicating interiorly of the rotisserie cabinet to monitor temperature.

The rotisserie cabinet includes a trough-like inclined drip pan that slopes to a drain opening through one end wall of the rotisserie cabinet. A chain extends from the drain opening downwardly to a receptacle whereby the liquefied fats and oils are removed efficiently from the rotisserie cabinet and wherein the drip pan prevents flame-up at the heat source.

The drip pan also provides rigidification to the rotisserie cabinet as it is fixedly secured from end wall to end wall of the rotisserie cabinet.

The end walls are preferably fixedly attached to the back wall of the rotisserie cabinet whereby to be easily carried as a unit and mounted atop the firebox walls of a grill device.

The breadbox-type hood provides the front and rear pivoting hoods to further include bent lip portions for rigidity along the central adjacent long upper edge of each when closed.

BRIEF DESCRIPTION OF THE DRAWINGS

The invention will be more fully understood and appreciated in conjunction with the drawings wherein:

FIG. 4 is a partial sectional view similar to FIG. 2 wherein the front hood is open and the front panel of the rotisserie cabinet is removed with the spit basket shown rolled part way toward the front of the rotisserie cabinet with an axle shaft thereof being rolled through a channel slot of a hood support panel.

FIG. 5 is a detailed sectional view of a roller bracket support for the axle shaft of the spit basket at one end thereof take along line 5—5 of FIG. 2;

FIG. 6 is a sectional view of the roller bracket and support rollers thereof taken along line 6—6 of FIG. 5; and, FIG. 7 is a partial sectional view similar to FIG. 2 but having the front wall of the rotisserie cabinet upwardly moved to remove lock pins thereof from pin sockets mounted to the end wall of the rotisserie cabinet.

DETAILED DESCRIPTION OF THE INVENTION

Figure 1:
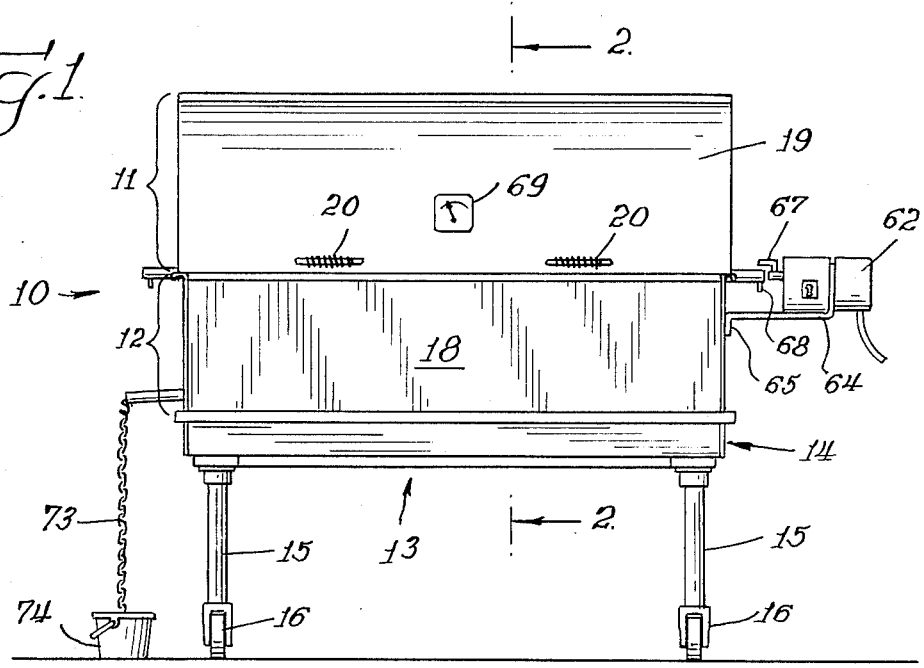
FIG. 1 is a front elevational view of the roll and load rotisserie assembly mounted to the firebox walls of a portable grill of a known widely used design.

The invention will now be more specifically described in conjunction with the foregoing drawings wherein like reference numerals refer to the same elements throughout.

STRUCTURAL FEATURES

The front elevational view of FIG. 1 illustrates the roll and load rotisserie assembly generally defined at reference numeral 10 in position during rotisserie oven-type cooking. The assembly 10 may be generally described as providing a two part hood 11 which covers over a removable rotisserie cabinet housing 12 below. Both the two part hood 11 and cabinet housing 12 are removably supported atop a standard grill device 13 having a firebox portion 14 for containing charcoal, or the like, and supported by legs 15 movable upon lower wheels 16. A significant characterizing feature of the roll and load rotisserie assembly 10 is the capability of quick and secure attachment atop a grill 13 wherein fasteners are not required and the cabinet housing 12 is easily placed atop upper edges of the firebox walls as will be explained. Thereafter the pivoting two part hood 11 may be engaged to the cabinet housing 12, or alternatively may be engaged thereto prior to placing the cabinet housing 12 atop the grill 13.

The firebox 14 of the standard grill 13 has a rectangular configuration in plan. A front wall 17 of the firebox 14 supports thereabove the front wall 18 of the cabinet housing 12. When closed, a front, or outside, hood 19 forms the front of the two part hood 11 and rests atop upper edges of the front wall 18 of the cabinet housing 12. The hood 19 has handles 20 extending therefrom for manually opening and closing it. The second part of the two part hood 11 comprises a rear, or inside, hood 21. The front hood 19 and rear hood 21 are, respectively, denoted as outside and inside hoods inasmuch as the front hood 19 pivots exteriorly around the rear hood 21 and conversely when the rear hood is desired to be open it rotates interiorily of the front hood 18. The operation of the illustrated embodiment of the inside/outside arrangement for the two part hood 11 will be described in conjunction with FIGS. 2 and 4 hereinafter.

Figure 2:
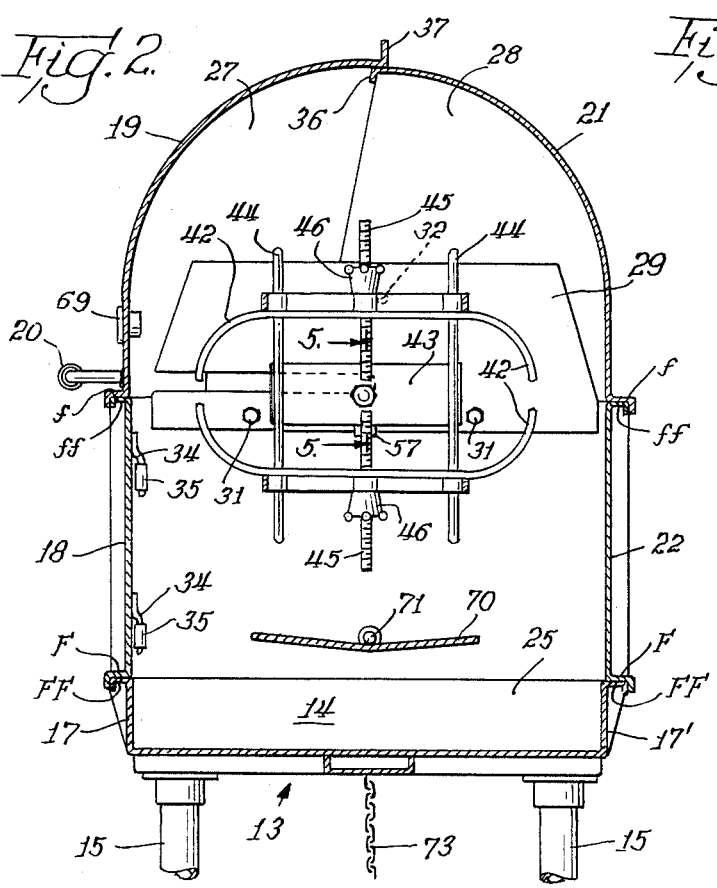
FIG. 2 is a sectional view of the roll and load rotisserie assembly and grill as shown in FIG. 1 taken along line 2—2.

A substantially mirror image rear wall 17' of the firebox 14 shown edgewise in FIG. 2, supports thereabove a rear wall 22 of the cabinet housing 12. The cabinet housing 12 is further formed by a left end wall 23 and right end wall 24, which are integrally constructed with, or fixedly attached, to the rear wall 22. The front wall 18 of the cabinet housing 12 is removably attached near the front edges of the end walls 23 and 24. The left end wall 23 and right end wall 24 of the cabinet housing 12 are supported atop, respectively, left end wall 25 and right end wall 26 of the firebox 14 as shown in the front elevational view of FIG. 3 wherein the front wall 18 has been removed and the front hood 21 has been lifted and rotated to the open position.

As best seen in FIGS. 2 and 4, the two part hood 11 has a breadbox-like configuration for covering over the cabinet housing 12. The outside front hood cover 19 includes substantially identical left and right end walls 27 and 27' for covering over and above the left and right end walls 23, 24 to enclose the cabinet housing 12. The inside hood 21 is similarly provided with left and right end walls 28 and 28', respectively, which extend above the left and right end walls 23, 24 of the cabinet housing 12 to further enclose the cabinet housing 12. The end walls 27, 28, 27' and 28' are only partial pie-shapes and act in conjunction with hood support panels 29, 30, as will be described, to form full heat loss barriers at either end.

The removable rotisserie cabinet housing 12 supports the two part hood 11 in pivotal relationship therewith by means of the hood support panels 29 and 30, respectively located and associated with the left and right end walls 23 and 24. The support panels 29 and 30 are substantially mirror images and can both be described by reference to only the left end wall 29 shown in FIGS. 2 and 4. Conventional nut and bolt fasteners 31 affix the panel 29 to the end wall 23.

Figure 3:
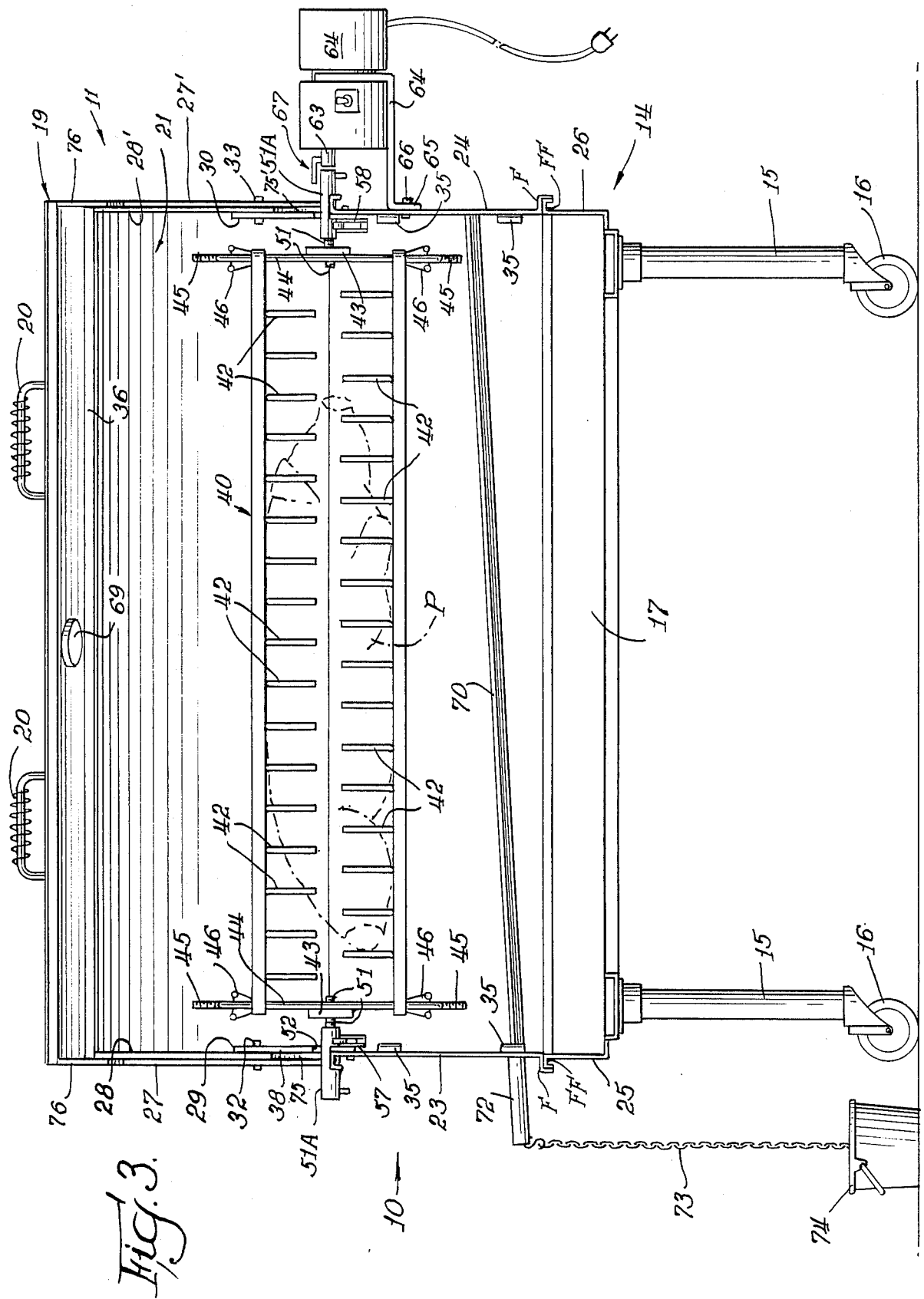
FIG. 3 is a front view of the roll and load rotisserie assembly with the front hood cover open and the removable front wall of the rotisserie cabinet removed to expose an adjustable spit basket supported therein, a drip pan and the interior of the assembly.

The left end walls 27 and 28 are pivotally engaged by means of a hinge pin 32 to the hood support panel 29. The right end walls 27' and 28' are identically pivotally hinged to the hood support panel 30 by means of a hinge pine 33 as shown in FIG. 3. Accordingly, the front hood 19 and rear hood 21 may be individually pivoted about the hinge pins 32 and 33 for opening the rotisserie assembly 10 from either the front or back of the grill 13.

Figure 7:
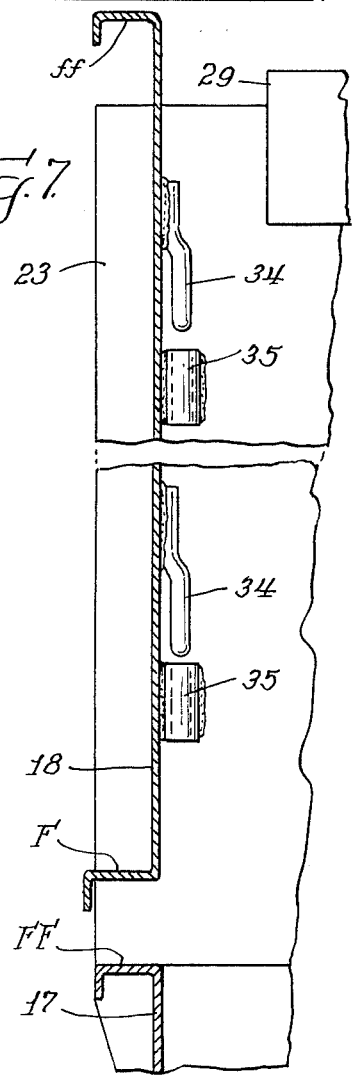

The removability of the front wall 18 of the cabinet 12 is provided by means of pin and socket assemblies best viewed in the sectional view of FIG. 7 taken in conjunction with the cut-away end view in FIG. 2. The front wall 18 is upwardly removable by means of two pairs of lock pins 34 arranged at opposite ends of the front wall 18 for sliding insertion into pin sockets 35 correspondingly positioned at interior sides of the end walls 23 and 24 of the cabinet housing 12. When the front hood 19 is pivoted about the hinge pins 32 and 33 to the open position as shown in phantom line in FIG. 2, the front wall 18 may thereafter be vertically displaced to disengage the lock pins 34 and removed to grant access to the interior of the cabinet housing 12. The front wall 18 is supportedly rested atop and along the front wall 17 of the firebox 14 at which no fasteners or attachments are required as explained below.

The simple mounting of the cabinet housing 12 to the firebox 14, and attaching the two part hood 11 to the cabinet housing 12, is best described with reference to the sectional view of FIG. 2.

Looking to the lower portion of FIG. 2, it will be seen that the bottom edges of walls 18, 22 are provided with outward extending L-shaped flanges F for supportively overlapping similarly formed L-shaped flanges FF formed along the upper edges of firebox walls 17, 17', and 25, 26. Likewise, the end walls 23 and 24 include substantially identical flanges F, as shown in FIG. 3. The flanges F rest atop the flanges FF in an overlapping supportive fashion therebetween substantially all along the rectangular perimeter formed by the cabinet housing 12 and firebox 14. The rear cabinet panel 22 and fixedly attached end walls 23 and 24, may be easily rested atop the firebox 14 of the grill 13 with or without the front panel 18 engaged at the pin socket 35. Thereby, the flanges F are able to rest atop the flanges FF without requiring fasteners or further attachment therebetween.

Also with reference to FIG. 2, it will be observed that the forward edge of the outside hood 19 and the rear edge of the inside hood 21 are formed with outwardly extending L-shaped flanges f. When the hoods are closed, the flanges f rest atop complementarily formed L-shaped flanges ff which extend outwardly from the upper edges of the front panel 18 and rear panel 22 of the cabinet housing 12. When the two part hood 11 is in the closed arrangement, as shown in FIGS. 1 and 2, they meet generally along the centerline of the assembly 10 at corresponding lips comprising inturned lip 36 of the front hood 19 and outturned lip 37 of the rear hood 21. The lips 36, 37 lie in vertical planar alignment when the hood 11 is closed. The lips 36 and 37 provide reinforcement for the hoods 19 and 21. The lip 37 also helps the hoods 19 and 21 be placed in a stable supported manner when either is opened. This latter function may be shown with the aid of phantom lines in FIG. 2., where it is observed that the hoods 19 and 21 pivot off-center to be able to clear past each other in a breadbox-like manner. When the front hood 19 is opened, the back of lip 37 rests supported against the hood 21 slightly above the flange F of the rear cover 21. When the rear cover 21 is opened, the inturned lip 37 will act as a stop for the flange f of rear hood 21 as the flange f arcuately travels to the top of the assembly 10 at the center line generally at the location of inturned lip 36 in FIG. 2.

To provide opening clearance for the movement of the two part hood 11, the hood support panels 29 and 30 are provided with inwardly tapering front and rear edges. In the sectional view of FIG. 4, the hood support panel 29 is shown having a front inwardly tapering edge 38 permitting clearance for closing of the hood 19 as well as allowing for the opening of the rear hood cover 21 to permit its inward lip 36 to move past. Inwardly tapering front and rear edges of the hood support panel 30 are substantially identical of those of hood support panel 29 as would be clear.

The two part hood 11 and cabinet housing 12 of the exemplary embodiment are made from conventional heat resistant heavy sheet steel construction to prevent warping and they are coated to have a black finish, although the finish could be any color. Similarly the firebox 14 of the grill 13 may be made of heat resistant steel coated with a black finish. The hood support panels 29 and 30 are also constructed of sheet steel but are slightly thicker to fulfill the additional support requirements for holding the rotisserie spit basket as will be described. The two part hood 11 and cabinet housing 12 of the illustrated embodiment are 12 gauge sheet steel and the hood panels are 7 gauge sheet steel. Two alternatives to the foregoing described use of sheet steel for the disclosed embodiment are stainless steel and aluminum. The practice of the invention of course is not limited to the particular materials and sizes disclosed, and those skilled in the art may choose particular dimensions and gauges suited for particular heat resistance and cooking needs within the scope of the invention.

The roll and load rotisserie assembly 10 is designed to accommodate a spit basket assembly 40 for holding items of food to be cooked, described for my invention in U.S. Pat. No. 4,442,762.

It is believed that the adjustable spit basket assembly 40 is now well known in the industry and consists mainly of a frame 41 having meat-enclosing tines 42. End plates 43 affixed at opposite ends of the spit basket assembly 40 are engaged by support rods 44 extending transversely thereto as shown in FIGS. 2 and 4. Extending centrally from welds to the end plates 43, and generally parallel to the support rods 44, are threaded rods 45 that provide for threadable communication with adjustment knobs 46 at the other side of the support frame 41 through which they extend. Tightening nuts 47 at the opposite side move with the knobs 45 to enable the frames 41 to carry the tines 42 in a telescoping manner as explained in said U.S. Pat. No. 4,442,762. With further reference to FIG. 5 it will be observed that a welded nut 48 is affixed to the end plates 43 between the welded ends of the threaded rods 45 at the basket-inward side of the end plates 43. At the outward sides, a lock washer 49 and threadable nut 50 are engaged to a threadable shaft 51 to enable the shaft 51 to be locked to the spit basket assembly 40. Extending axially outward from the shaft 51, is an axle shaft 51A having a smooth outward surface and larger diameter than the threaded shaft 51. Axle shaft 51A may be integrally formed with the threaded shaft 51 or provided as an interiorly thread engaging sleeve like extension. The axle shafts 51A extend axially outward from the spit basket assembly 40 through channel slots 52 and 53 of the hood support panels 29 and 30 respectively. The accommodation of the axle shaft 51A at the slot 52 is best seen in the sectional views of FIGS. 2 and 5. During rotisserie cooking, the axle shafts 51A reside in recessed seats of the channel slots 52, 53, as at seat 54 of channel slot 52 best viewed in FIG. 4. A corresponding notched, or arcuate, seat 55 is provided in the end wall 23 whereby the axle shaft 51A is allowed to rotate and move through the channel slot 52 and thereafter move within the seats 54 and 55 during rotisserie operation as in FIG. 2. To enter seats 54 and 55 the axle shaft 51A rolls along a lower edge 56 of the channel slot 52. In the disclosed embodiment the axle shafts 51A have a ⅜ inch diameter. The axle shafts 51A may roll or slide along the channel slot lower edges in order for the spit basket assembly 40 to enter or leave the rotisserie assembly 10. A corresponding configuration at the opposite end of the rotisserie assembly 10 would be provided with respect to the hood support panel 30 and associated right end wall 24 of the cabinet housing 12.

The axle shafts 51A are rotationally supported within the seats 54 and 55 by roller support assemblies 57 and 58, respectively, at the left and right ends of the rotisserie assembly 10. The sectional view of Fig. 6 taken along line 6-6 of FIG. 5 depicts the roller support assembly 57 at the left end of the rotisserie assembly 10. The roller support assembly 57 is constructed of a pair of roller brackets 59 that are bored at two locations to receive two roll pins 60. The roll pins 60 rotationally engage rollers 61 which are spaced slightly apart to rotationally cradle the axle shafts 51A of the spit bracket assembly 40 as the assembly 40 is rotated during cooking.

The roller support assemblies 57 and 58 are constructed to space the rollers slightly upward from the arcuate lower surfaces of the seats, as is illustrated in FIG. 6 for rollers 61 of the assembly 57 that are arranged at the seats 54 and 55 of the channel slots 52 and wall 23. The rollers 61 support the axle shafts 51A and they therefore do not bear upon the seats 54 and 55 in order to assure free rotation. The roller brackets 59 of the illustrated embodiment are made of 7 gauge steel and the roll pins 60 and rollers 61 are also made of steel to provide heat resistance and long wear.

The spit basket assembly 40 is rotationally driven by a rotisserie motor 62 which is the exemplary embodiment at 6 r.p.m. direct gear drive motor. The rotisserie motor 62 is arranged to have a drive shaft 63 thereof extend axially to one of the axle shafts 51A to be engaged therewith. The rotisserie motor 62 is mounted atop a motor mount 64 which has a downward flange 65 that is affixed to the right end wall 24 of the cabinet housing 12. The rotisserie motor 62 and motor mount 64 may optionally be located at the left end wall 23 and is a matter of choice to one practicing the invention. Conventional nut and bolt fasteners 66 attach the flange 65 to the end wall 24. Known types of locking means, such as a lock coupling means 67, may be used for locking engagement by a thumb screw and lock nut assembly 68 arranged along the axle shaft 51 whereby to releasably engage the axle shaft 51A in driving relationship to the drive shaft 63. The releasable coupling of the shaft 51A to the rotisserie motor allows both axle shaft 51A to be rolled into position on the rollers 61 and thereafter the lock coupling means 67 is engaged by the thumb screw and lock nut assembly 68 at the corresponding axle shaft 51A. When the spit basket assembly 40 is required to be removed from the rotisserie assembly 10, the lock coupling means 67 may be disengaged from the thumb screw and lock nut assembly 68 to permit the free outward rolling movement of the axle shafts 51A.

The front hood 19 preferably includes a thermometer 69 that communicates interiorly of the hood 11 and cabinet housing 12 for monitoring the inside temperature during cooking.

In satisfaction of the need to prevent flame-ups during cooking procedures, the rotisserie cabinet housing 12 is further provided with a lengthwise drip pan 70 that has a shallow "V" construction as best viewed in FIG. 2. The drip pan 70 is connected to the left end wall 23 and right end wall 24 of the cabinet housing 12 and slopes from right to left to a drain opening 71 extending through the left end wall 23. A tubular drain spout 72 communicates with the drain opening 71 and slopes outwardly to extend away from the firebox 14. A drip chain 73 extends downwardly from the drain spout 72 to a receptacle 74 for collection of liquefied fat, oils and the like that drip from the meat cooked in the spit basket assembly 40 rather than allow them to drip downwardly onto heat source within the firebox 14 and cause unwanted flame-up. In the illustrated embodiment, the width of the drip pan 70 is approximately fifty percent of the width of the cabinet housing 12 to provide for a fairly wide drip collection coverage surface under the basket assembly 40 and provide an antiflame-up means.

It will be further appreciated that the end walls 27, 27' of the front hood 19 and end walls 28 and 28' of the rear hood 21 efficiently overlap otherwise open spaces around the hood support panels 29 and 30 to provide thermal barriers for the rotisserie assembly 10 in order to minimize heat loss. The bottom edges of these four end walls, as viewed when closed, are not straight edges thereacross but are provided with overlapping configurations to effectively create the thermal barrier effect that is particularly needed between the tapered edges 38, 39 of the hood support panels 29, 30 and the front and rear hoods 19, 21, as best viewed in FIG. 2. This overlapping is provided in part by a trapezoidal flange flap 75 portion of the end wall 28 and a rectangular flange portion 76 of end wall 27. End walls 27', 28' likewise have identical flaps 75' and flange 76', respectively, which are not shown in the drawings. The function and operation of the roll and load rotisserie assembly 10 in conjunction with the grill 13 for cooking food on the adjustable spit basket assembly 40 will now be described.

OPERATION

The roll and load rotisserie assembly 10 provides for a self-contained rotisserie cabinet and rip pan with no awkward lifting or arm's length reaching required. The spit basket 40 may be simply positioned by means of the axle shafts 51A being rolled just a few revolutions along and through the channel slots 52, 53 of the hood support panels 29, 30 into the seats of the hood support panel and associated seat of the end walls of the cabinet to be supported atop the rollers 61 of the roller support means 57. Then, the axle shaft 51A at one side of the spit basket 40 may be connected to the drive shaft 63 of a rotisserie motor 62 and locked to begin rotisserie roasting.

Access to the front of the cabinet 12 is easily achieved by grasping the handles 20 and rotating the front hood 19 to pivot around the hinge pins 32 and 33 to expose the interior of the cabinet housing 12.

The front panel 18 of the cabinet 12 is releasably mounted with respect to the cabinet housing 12 and atop a front wall 17 of the firebox 14 so that when one needs to remove the adjustable spit basket 40, the front panel 18 is quickly lifted up and the reverse procedure for mounting the spit basket 40 is undertaken by disconnecting the drive shaft 63 and easily rolling the axle shafts 51A atop the roll-on edges 56 of channels 52.

A heavy load of food can been cooked such as shown by the illustrated pig in FIG. 3 for which handling and loading and unloading can become difficult. Pig roast outings oftentimes involve cooking a pig that can weigh 150 lbs. or more.

The disengagement of the front panel 18 coupled with rotating the front hood 19 to the open position also permits for a large access opening to the item being cooked whereby the pig, for example, may be carved, basted, seasoned or the like, and fire tended, in a quick manner. Then, the front panel 18 may be put back into place and the front hood 19 pivoted to close so that oven-type cooking can quickly resume with minimum cooling of the food item.

The rear hood 21 is rotationally pivotable about the hinge pins 32 and 33 whereby the opposite side of the roll and load rotisserie assembly 10 may be opened so that, for example, a chef may optionally inspect, baste or season the food, adjust the spit assembly, add fuel, etc., from the rear side rather than the front side of the assembly 10.

It will be understood that the standard grill 13 shown in the illustrative embodiment is provided with the firebox 14 which may contain charcoal, a gas heat source, and the like. The upward edges of the firebox walls are provided with standard formed flanges ff which are nest-engageable by flanges f of the cabinet housing 12 for a sure stable positioning. The drip pan 70 provides for an antiflare-up means and also offers further reinforcement between the end walls 23 and 24, which are also fixedly engaged to the rear wall 22. Thus, the rear wall with the two end walls attached may be simply vertically placed atop the firebox 14 with or without the front panel 18 being comtemporaneously engaged by the lock pins 34 at the pin sockets 35. The two part hood 11 is engaged by the hinge pins 32 and 33 to the hood support panels 29 and 30. The two part hood may be pre-engaged at the hinge pins so that it and the cabinet housing 12 may, as a unit, be disposed atop the firebox 14. Alternately, the two part hood 11 may be later attached by the hinge pins 32 and 33 to the hood support panels 29 and 30 following the placement of the cabinet housing 12 onto the firebox 14. The breadbox-type construction provides an outside and inside movable relationship with an off-center pivoting of the hoods 19 and 21, wherein the end walls thereof provide a thermal barrier in cooperation with the hood support panels as explained above.

As a result an effortless quick conversion of a standard grill to a roitsserie oven is achieved by the mounting of roll and load assembly 10 to a correspondingly sized grill and firebox. Screws, mechanical fasteners, bolts, or the like, are not required.

While the invention has been described in conjunction with drawings of an illustrative embodiment thereof, it is to be understood that the invention envisions a broad range of equivalents as set forth in the claims appended hereto.

What is claimed:

1. A rotisserie assembly for attachment to the firebox of a grill comprising:
   a cabinet housing including walls having means for mounting onto a firebox of a grill and including one wall thereof being removable from the other walls,
   a hood means covering said cabinet housing and having two pivotally arranged hood members capable of pivoting relative to one another to open and close over said cabinet housing, spit means for holding food items to be cooked and including axle shaft means,
   support means pivotally supporting said hood members and including means for loading and unloading said spit means from said rotisserie assembly, and
   a pair of opposing support panels arranged at opposite end walls of said cabinet housing and wherein said hood members include opposing end walls, said opposing end walls of the hood members being pivotally engaged to said support panels.

2. The rotisserie assembly as claimed in claim 1 wherein said assembly includes roller support means for rotationally supporting the axle shaft of said spit means.

3. The rotissere assembly as claimed in claim 1 wherein said roller support means is mounted relative to said support means to be adjacent said means for loading and unloading said spit means whereby to rotationally support said axle shafts of said spit means.

4. The rotisserie assembly as claimed in claim 1 wherein said spit means includes a basket means for accommodating food items therein.

5. The rotisserie assembly as claimed in claim 1 wherein said hood means comprise two curved hood members, one being outside and the other being inside relative to each other, said outside hood 6. The rotisserie assembly as claimed in claim 1 wherein said assembly includes a drip pan means sloping interiorly between two walls of said cabinet housing, one of said walls including a drain opening therethrough to said drip pan means for draining fat, oils and the like from food items being cooked.

7. The rotisserie assembly as claimed in claim 1 wherein the cabinet housing means for mounting atop a firebox comprises flange means extending from said wall capable of overlapping upper edges of the walls of a firebox.

8. The rotisserie assembly as claimed in claim 1 wherein said cabinet housing has a rectangular configuration in plan and having front and back opposing long walls and transverse opposing shorter end walls wherein one of said long walls is removable.

9. The rotisseries assembly as claimed in claim 1 wherein said means for loading and unloading the spit means comprises channel slot means for rolling the axle shaft means of said spit means therethrough for moving said spit means during loading and unloading of the spit means into and from said rotisserie assembly.

10. The rotisserie assembly as claimed in claim 8 wherein said front wall is removable.

11. The rotisserie assembly as claimed in claim 10 wherein said removable front wall includes means for releasable attachment to said end walls.

12. The rotisserie assembly as claimed in claim 11 wherein said means for releasable attachment comprises lock pin means.

13. The rotisserie assembly as claimed in claim 1 wherein said two hood members are commonly hingedly attached at opposite ends thereof to said support means.

14. A roll and load rotisserie assembly comprising:
a firebox,
a cabinet housing removably mounted to said firebox,
a two part hood means hingedly attached whereby the two parts are pivotable relative to one another,
hood support panel means mounted with said cabinet housing and hingedly supporting said two part hood means, said hood support panel means including channel slot means,
a spit basket means including oppositely extending axle shafts, said axle shafts being movable through said channel slot means,
roller means for rotationally supporting said axle shafts, said roller means communicating with said channel slot means whereby said axle shafts may be rolled to and from being rotationally supported at said roller means.

15. The roll and load rotisserie assembly as claimed in claim 14 wherein said cabinet housing includes a plurality of walls, one wall being removable from the rest independently thereof.

16. The roll and load rotisseries assembly as claimed in claim 14 wherein said two part hood means comprises an outside and an inside hood, both being pivotal relative to each other at said hood support panel means.

17. The roll and load rotisserie assembly as claimed in claim 16 wherein said two hoods include end wall means closing over ends of said rotisserie assembly generally adjacent said hood support panel means to form a thermal barrier therewith.

18. The roll and load rotisserie assembly as claimed in claim 14 wherein drip pan means extend beneath said spit basket means and are attached at opposite ends thereof to said cabinet housing.

19. The roll and load rotisserie assembly as claimed in claim 14 wherein said assembly includes motor mount means for a rotisserie motor attached to said cabinet housing.

20. A roll and load rotisserie assembly for use with a grill having firebox walls and comprising: a four walled cabinet housing having one wall removable from the other three walls; means for pivotal engagement arranged at two opposing walls of said cabinet housing, said two walls being hood support panels; two pivotable hoods above said cabinet housing, said hoods having opposing end walls hingedly mounted to said means for pivotal engagement at said support panels whereby to be relatively pivotal to each other for closing and opening above said cabinet housing; rotatable spit means for holding food items to be cooked interiorly of said rotisserie assembly, said spit means extending generally between said means for pivotal engagement and including axle shaft means; means for loading and unloading said spit means from said rotisserie assembly; and, said cabinet housing capable of being removably mounted atop upper edges of the firebox walls of a grill.

* * * * *